(12) United States Patent
Dietrich

(10) Patent No.: US 6,991,674 B2
(45) Date of Patent: Jan. 31, 2006

(54) MONITORING ARRANGEMENT FOR COMPARTMENT AIR CONTAMINATION

(75) Inventor: Gunnar Dietrich, Mannheim (DE)

(73) Assignee: Deere & Company, Moline, IL (US)

( * ) Notice: Subject to any disclaimer, the term of this patent is extended or adjusted under 35 U.S.C. 154(b) by 128 days.

(21) Appl. No.: 10/675,840

(22) Filed: Sep. 30, 2003

(65) Prior Publication Data

US 2004/0065204 A1    Apr. 8, 2004

(30) Foreign Application Priority Data

Oct. 1, 2002    (DE) .................................. 102 45 689

(51) Int. Cl.
*B01D 35/14*    (2006.01)
(52) U.S. Cl. ...................... 96/397; 96/418; 96/419; 96/421; 96/423; 96/424; 55/385.3; 55/467
(58) Field of Classification Search ............... 55/385.3, 55/467; 96/111, 113, 397, 417, 418, 419, 96/421, 423, 424, 467; 95/8, 22, 25, 26
See application file for complete search history.

(56) References Cited

U.S. PATENT DOCUMENTS 4,581,988 A * 4/1986 Mattei .......................... 454/70
6,040,777 A * 3/2000 Ammann et al. ........... 340/632

FOREIGN PATENT DOCUMENTS

JP           04190824 A * 7/1992 .............. 73/863.23

* cited by examiner

*Primary Examiner*—Robert A. Hopkins

(57) ABSTRACT

An air quality monitoring arrangement is associated with an enclosed cab of an agricultural tractor used for towing or carrying spraying implements for treating crop with substances which might be toxic or otherwise harmful to people. A signal from a contaminant sensor is sent to a control arrangement which compares the actual sensed contamination of the air within the cab over time with a value from a performance map representing the performance expected from normal performance of the air circulating system of the cab. When the sensed contamination is higher than that of the performance map the operator is warned of a malfunction. The blower of the air circulating system may have its speed increased so as to pressurize the cab so as to exclude the entry of contaminated air through seals and other small openings of the cab. The air filters used are coded and recognized by the control system which keeps track of the service time of the filters and warns an operator when the service time exceeds that of a stored time value related to the particular filter.

9 Claims, 3 Drawing Sheets

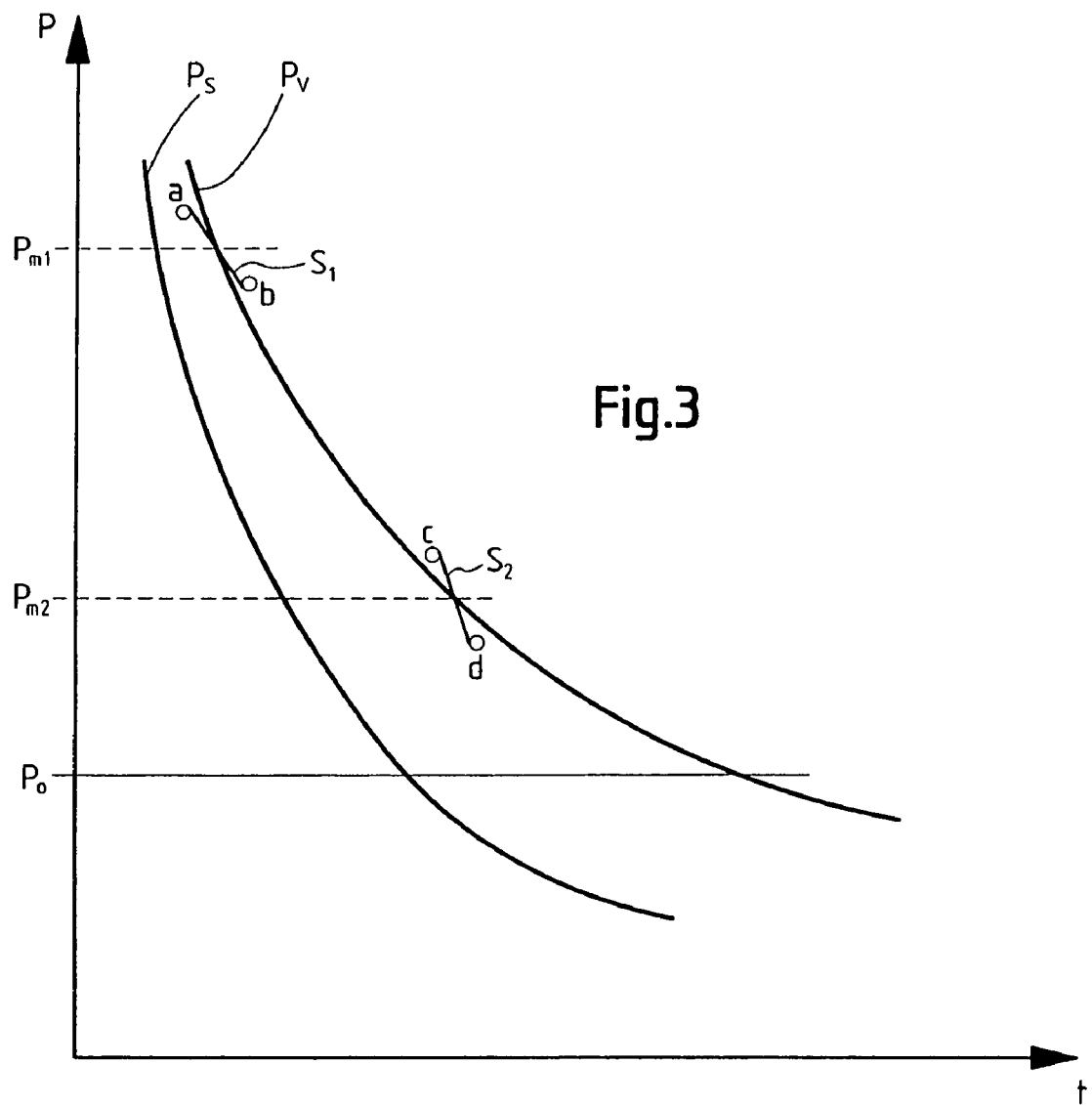

MONITORING ARRANGEMENT FOR COMPARTMENT AIR CONTAMINATION

FIELD OF THE INVENTION

The invention concerns an arrangement for the monitoring of the degree of contamination in a closed compartment, particularly in a vehicle cab. The arrangement includes at least one blower that conveys air into the closed compartment through at least one filter element. At least one sensor detects the degree of contamination in the air of the interior of the compartment and is connected with a control arrangement.

BACKGROUND OF THE INVENTION

In tractor cabs that are specified for the application of sprayed materials according to ASAE S525 with a particle size of 3 $\mu$m, a particle reduction ratio of 50:1 from the surroundings to the interior of the cab is required. Despite a corresponding layout of the spray and air circulation system, the permanent maintenance of this reduction ratio is not always guaranteed. Problems may occur, for example, if the maximum allowable operating time of the filters is exceeded due to improper maintenance, if damage to the cab remains undiscovered, if aging of the cab seals occurs or if the cab sealing no longer meets the requirements due to improper repair operations. In particular, during the application of particles that are toxic or harmful to health, the maintenance of a pre-determined maximum load within the compartment, particularly in the interior of the cab, must be guaranteed.

DE-U-93 12 523 describes an arrangement for the monitoring of the operating time of filter arrangements in heating and ventilating installations, in which the compartment air is conveyed by means of a blower through a channel in which a filter is arranged. A sensor is arranged on each side of the filter for the measurement of the concentration. An input arrangement is provided with a tank for a test medium, a pump and an inlet nozzle arranged in the in-flow region ahead of the filter. A test medium is injected automatically in pre-determined time intervals through the inlet nozzle. A control arrangement monitors the signals of the two sensors and activates an optical and/or acoustic signal whenever the values of the concentrations ahead of and behind the filter approach each other, which can be ascribed to a reduction in the filter capacity. This arrangement requires two sensors and a relatively costly input arrangement for a test medium. Therefore, it is uneconomical and inappropriate for a number of applications.

The problem underlying the invention is seen in the need to define an arrangement for the monitoring of the degree of contamination of the air in a closed compartment of the type cited initially through which the aforementioned problems are overcome and the requirements are attained. In particular, the arrangement should also be appropriate for the monitoring of particles that are toxic or harmful to health. It should make possible a reliable detection of poisonous quantities and protect persons from damaging air pollution. Beyond that, it should make possible an evaluation of the filter system according to the actual load, so that a filter change is performed on the basis of the degree of contamination and not merely after the expiration of fixed maintenance intervals.

SUMMARY OF THE INVENTION

According to the present invention, there is provided an improved air quality monitoring system.

An object of the invention is to provide a monitoring system that employs a performance map, that is stored in memory, which indicates a decrease over time of the degree of contamination and to measure the actual contamination and compare it to the stored value and to issue a warning signal upon finding a deviation from the performance map.

The performance map corresponds to an orderly operation of the compartment and filter system in which the particle concentration decreases on the basis of the filter operation over a certain course of time. The performance map contains, for example, a function that reproduces the course over time of the degree of contamination, such as a particle concentration or a particle count. The performance map can be determined, for example, by tests on the closed compartment, particularly on the vehicle cab, in that during a test operation in surroundings with a known and constant degree of contamination, the decrease over time of the contamination within the compartment is detected. It is also possible to calculate a theoretical decrease over time, in particular on the basis of the volume of the compartment, the conveying capacity of the blower and the filter characteristics, and then to provide that as input.

Furthermore, the control arrangement according to the invention contains means that continuously detect the actual degree of contamination in pre-determined time intervals and compare these with the values of the performance map coordinated in time. If deviations between the performance map of the contamination and the measured contamination decrease over time, then this points to malfunctions. These may be attributed, for example, to the fact that the filter effect of the filter element is no longer sufficient, that the ventilation circuit is not longer fully functional or that more contamination enters from outside into the closed compartment, for example, due to inadequate sealing or open doors or windows, than would have been expected on the basis of the arrangement used.

If the desired decrease in the concentration does not occur, then the control arrangement issues warning signals that bring the matter to the attention of persons. This can be performed by lighting a warning lamp or the release of an acoustic signal. With the warning signals, safety measures can also be initiated. If this is, for example, a vehicle with which plant protective spray materials are applied, an automatic stop to the spraying activity can be insured.

According to a preferred embodiment of the invention, the interior sensor is a particle sensor or a particle counter. As a sensor to detect the degree of contamination, for example, a particle counter can be used that operates on the basis of the known principle which is used in the measurement cells of the type 227B that are distributed in Germany by the MetOne company. This measurement cell is appropriate to detect particles down to an order of magnitude of 0.3 $\mu$m or of 3 $\mu$m.

For an agricultural application of a tractor with a field sprayer or a self-propelled plant spraying implement, an interior compartment sensor is preferably attached in the vehicle cab that responds to particles that are toxic or harmful to health, for example, to finely dispersed plant protective materials. If after the beginning of the operation of the vehicle, the monitoring arrangement according to the invention determines that the particle concentration in the vehicle cab does not decline as rapidly as a pre-determined process, then the field sprayer or the plant protective implement is turned off in order to protect the operator and to give the operator a chance to discover the cause of the malfunction.

Preferably, an interior compartment sensor is selected that is able to detect particles of a size down to an order of magnitude of 0.3 $\mu$m to 3 $\mu$m.

The monitoring arrangement according to the invention can be applied to great advantage in an air circulating system in which the air of the compartment is conducted by means of a blower in an air circulating circuit that includes at least one circulating air filter element. It is also advantageous to use the monitoring arrangement according to the invention in connection with a fresh air circulating circuit in which the fresh air is drawn by a blower through a fresh air channel, in which at least one fresh air filter element is arranged, and is blown into the closed interior compartment. Thereby, an overpressure is generated in the interior compartment that is partially reduced by leakages. There is a particular advantage in using a combination of a circulating air circuit and a fresh air circuit, since fresh air is constantly supplied by the fresh air circuit and a slight overpressure is generated and the filtration effect is increased by the circulating air circuit and the air conditioning of the compartment is simplified.

According to a preferred embodiment of the invention, a slight overpressure is generated in the closed interior compartment which preferably lies between 50 and 200 Pa, relative to the surroundings by the blower that is also used as a fresh air blower.

The filter element, i.e., the circulating air filter element and/or fresh air element, generally includes a filter mat that holds back particles such as dust and toxic particles. There is a particular advantage if the filter element also includes activated charcoal, by which gaseous substances, particularly odors, are filtered.

Preferably, the internal pressure is monitored by a pressure sensor arranged in the compartment. The pressure sensor may be an aneroid cell with a display that can be read. The internal pressure is issued as an electrical signal, detected by the control arrangement, and compared with a pre-determined desired internal pressure. The rotational speed of the blower is regulated by the control arrangement, preferably continuously variable, in such a way that the desired internal pressure is attained. The greater the degree of contamination of the filter element, the more the internal pressure sinks, so that the rotational speed of the blower must be readjusted correspondingly. If during this process the maximum rotational speed of the blower is exceeded, then a warning signal is issued and incorporated in the system in which, for example, a field sprayer is turned off.

An advantageous further development of the invention provides that the circulating air filter element and/or the fresh air filter element are each provided with at least one coding element that permits an identification of the filter element. In the region of the filter holder, a recognition arrangement is arranged that can recognize the coding. The filter coding permits an identification of the filter element. The coding can be performed, for example, by a chip similar to the known EC-card chip, a bar code or by a mechanical coding. The information transmission between the coding element and the recognition arrangement is preferably performed without contact so that the components may be encapsulated, for example, enclosed in plastic and are thereby protected against dirt and corrosion. On the basis of the coding, the monitoring arrangement recognizes the filter type and can automatically recall the associated performance curve of the performance map that was stored in memory for the comparison with the degree of contamination measured.

There is a particular advantage in coupling the filter identification with a filter operating time counter. As soon as a filter element is installed and the air filtration system is activated, the control arrangement recognizes this condition and the filter operating time counter is started. In a vehicle, the filter activation can be performed, for example, by the starting by means of an ignition key. The operating time counter detects all activation phases of the air filtration system, accumulates these, and stores the cumulated values in memory. The control arrangement associates each filter element with the cumulated operating time. When a pre-determined maximum operating time for a filter element has been reached, this filter element becomes unusable for further use and a warning signal is issued, and if necessary, incorporated into the system, in which for example, a field sprayer is stopped.

The monitoring arrangement according to the invention permits a continuous and reliable checking of the system of the sealing of the space and the air filtration as to its capability of functioning. In particular, lack of sealing of the closed compartment is recognized early. A warning is also issued if the operator has neglected to close windows and/or doors of the compartment. The system responds when the maximum allowable operating time of the filters is exceeded due to improper maintenance and the filter action is reduced. Thereby, a maximum protection of persons is constantly assured, particularly against highly toxic particles. Filter elements can be changed at appropriate times, particularly when their degree of contamination makes this necessary.

The drawing shows an embodiment of the invention on the basis of which the invention as well as further advantageous further developments and embodiments of the invention shall be explained and described in greater detail in the following.

BRIEF DESCRIPTION OF THE DRAWINGS

FIG. 3 is a diagram illustrating the reduction over time of the degree of air contamination.

DESCRIPTION OF THE PREFERRED EMBODIMENT

Figure 1:
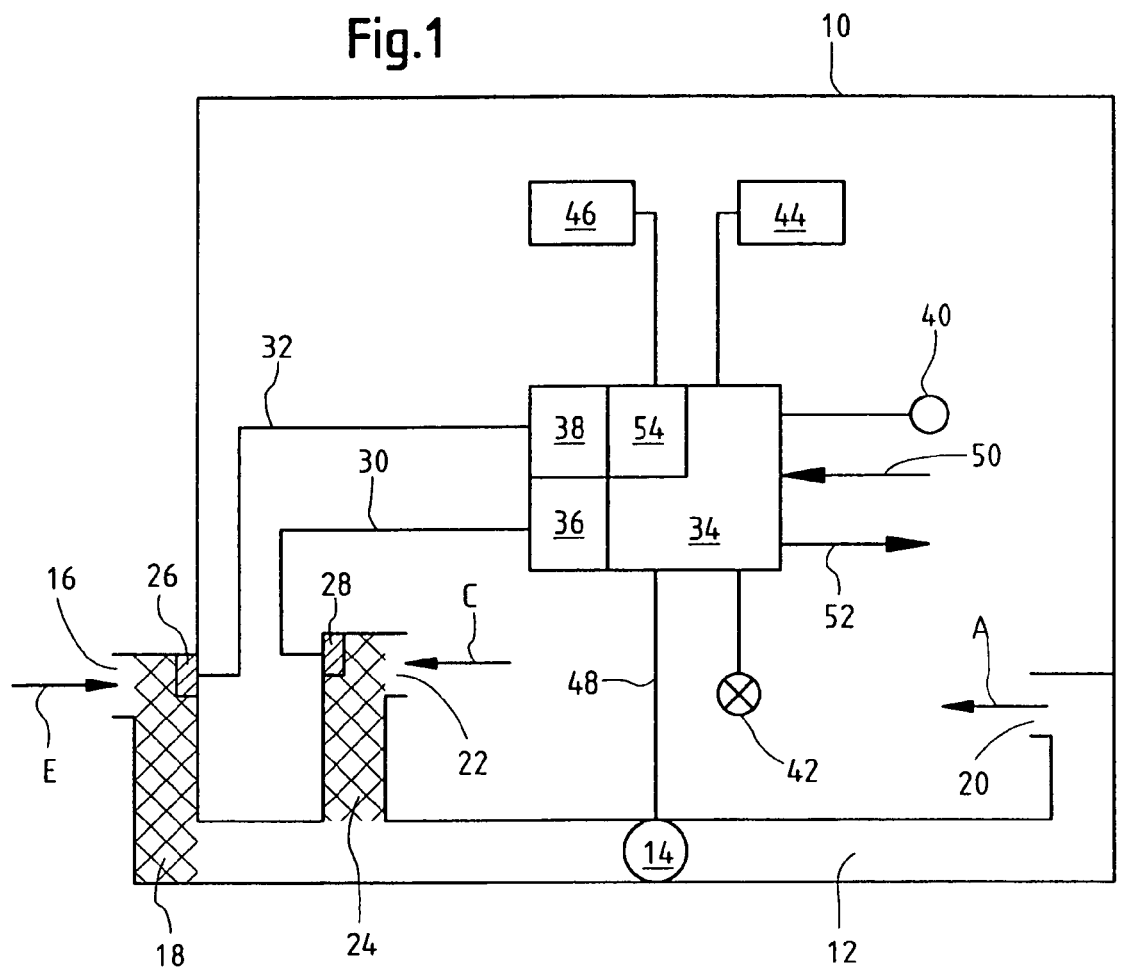
FIG. 1 is a schematic view of a closed compartment with an air quality monitoring arrangement constructed in accordance with the present invention.

Referring now to FIG. 1, there is shown a vehicle cab 10, which is indicated by a surrounding line. The cab 10 is that of an agricultural tractor, not shown in any further detail, that is coupled to a field sprayer for the application of a liquid or any other finely dispersed plant protective material. An air channel or duct 12, in which a blower 14 is arranged, extends within the cab 10. The blower 14 draws surrounding air E through a fresh air inlet 16 and a fresh air filter element 18. The surrounding air E may be loaded, among other items, with dust particles, toxic particles or particles harmful to health and odor carrying materials which are filtered out more or less completely by the fresh air filter element 18. The clean air A is conducted through an air outlet 20 into the interior of the cab. A slight overpressure of air is generated in the cab 10 by the blower 14 that forces air to the outside through unsealed areas of the cab or openings that are purposefully provided. The result is a fresh air circuit.

Simultaneously, the blower 14 draws cab air C from the interior of the cab through a circulating air inlet 22 and a circulating air filter element 24, and conducts it through the air outlet 20 back into the interior of the cab. The circulating air filter element 24 is used to clean the cab air further. The circulating air inlet 22, the circulating air filter element 24, the air channel or duct 12, the blower 14, and the air outlet 20 form an air circulating circuit.

The fresh air filter element 18 as well as the circulating air filter element 24 contain a usual filter mat, that holds back particles such as dust and toxic particles. Beyond that, the filter elements also contain activated charcoal for the filtering of odors.

The filter elements 18 and 24, respectively include coding elements 26 and 28 that are each associated with a reading implement, not shown in any further detail, that is installed in the cab 10. The reading implements are connected over lines 30, 32 with an electronic control arrangement 34. The control arrangement 34 contains a recognition arrangement 36 that evaluates the signals of the reading implements and that identifies the filter element 18, 24 that is installed with regard to its type and its serial number. Furthermore, the control arrangement 34 contains a filter operating time counter 38 that starts when the vehicle is started by actuation of an ignition switch 40 and that interrupts the counting upon the stopping of the vehicle. The recognition arrangement is coupled with the operating time counter in such a way that for each filter element 18, 24 that was recognized, a cumulative operating time count is formed. The operating time count is compared with a maximum operating time limit of each filter type characterized by the coding. Upon reaching the maximum operating time limit, a warning signal is issued over a warning lamp in order to call the operator's attention to the need for a filter change.

In the cab 10, a pressure sensor 44 for the measurement of the interior pressure in the cab 10, as well as, a particle sensor 46 are arranged; the latter measures solid and liquid particles and thereby also responds to particles of a liquid fog, particularly to toxic particles or those harmful to health, such as plant spray protective materials. The signals of the pressure sensor 44 and of the particle sensor 46 are processed by the control arrangement 34. The control arrangement 34 is connected over a line 48 with the blower 14, and receives signals 50 regarding the operating condition of the field sprayer.

Figure 2:
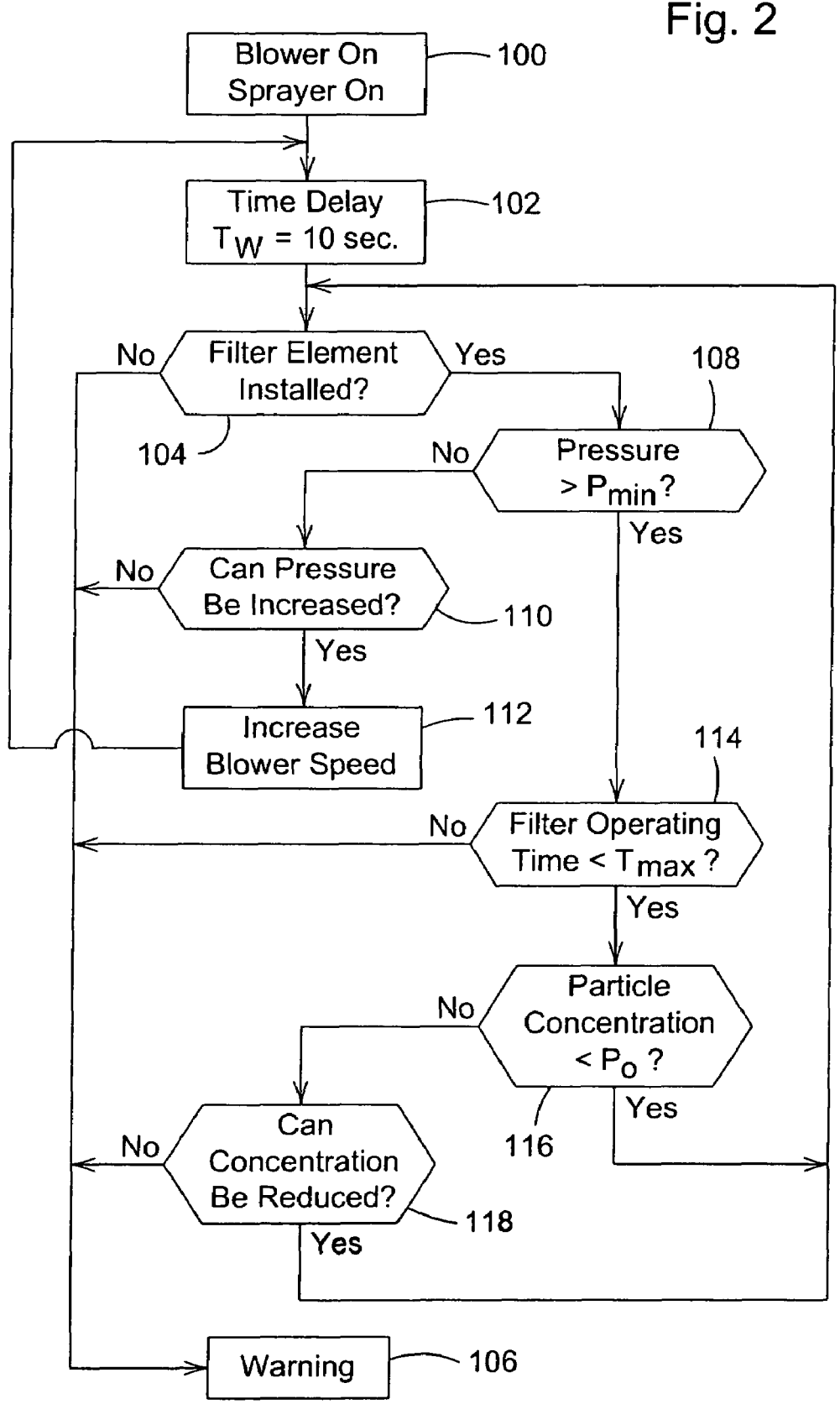
FIG. 2 is a flow chart describing the operation of the monitoring arrangement of the present invention.

The manner of operation of the control arrangement 34 is explained on the basis of the flow chart shown in FIG. 2. Initially, the control arrangement 34 tests in step 100 whether the blower 14 and the field sprayer are in operation. Then, in step 102, a time delay of $T^w$ of ten seconds is maintained, during which the required overpressure can build up. On the basis of the filter, coding step 104 tests whether and which filter elements 18, 24 are installed that are suitable for the spraying operation. If no appropriate filter elements 18, 24 are installed, a warning signal is issued in step 106. The warning signal issues an optical warning via warning lamp 42 and an acoustic warning and stops the filed sprayer over the control line 52 so that the application of sprayed material is interrupted.

If appropriate filter elements 18, 24 are installed, then the algorithm tests in step 108 whether the interior pressure in the cab exceeds a pre-determined minimum value $P_{min}$. If this is not the case, then step 110 tests whether the output of the blower can be increased. If this is not possible, a warning signal is issued in step 106. Otherwise, the blower output is increased in step 112 and the algorithm returned to step 102.

If an adequate interior cab pressure is detected in step 108, then subsequently in step 114, a check of the filter operating times is performed. If the operating time counter 38 shows that the maximum allowable operating time of the filter element 18, 24 has been reached or exceeded, a warning signal is issued in step 106. If the maximum allowable operating time has not been exceeded, then step 116 tests whether an allowable maximum particle concentration $P_o$ is maintained within the cab, and upon obtaining a positive result, returns the algorithm to step 104.

If the maximum allowable particle concentration $P_o$ is not maintained, then step 118 decides whether the reduction over time of the particle concentration lies within the limits of a predetermined course. If the particle concentration decreases with sufficient rapidity, then the algorithm returns to step 104; otherwise a warning is issued by step 106.

The test step 118 is explained on the basis of the diagram shown in FIG. 3, that shows a course over time of the particle concentration P existing within the cab 10. The rate of the count in the particle sensor 46 is a measure of the particle concentration. During operation without any trouble, a given particle concentration in the vicinity of the cab 10 decreases steadily according to a certain standard course after the start of operation of the blower 14. This standard course can be determined from a test run or calculated approximately on the basis of the existing configuration and is shown in FIG. 3 as curve $P_s$. As can be seen, the particle concentration decreases rapidly at first and then constantly less rapidly, that is, the curve $P_s$ becomes flatter over time. The curve $P_s$ is stored in a performance map memory 54 in the control arrangement 34.

In practical operation, the decrease of the particle count should correspond as much as possible to the idealized standard course, although a lower rate of decrease of the particle concentration within certain limits is permitted. For this purpose, a comparison curve $P_v$ is formed, in which the time scale is stretched by a certain factor compared to the standard curve $P_s$. In the example shown, this stretch factor is 2. The comparison curve $P_v$ is also stored in the performance map memory 54.

In step 118, the particle concentration P existing in the cab 10 is measured twice with a time delay of, for example, one minute. From the two measured values, the slope of the decrease of the concentration is calculated. This slope is compared with the slope of the comparison curve $P_v$ which applies in place of the man value $P_m$ of the two measured concentrations.

FIG. 3 shows two measured slopes $S_1$ and $S_2$ with the associated measurement points a, b or c, d and their measured values $P_{m1}$ and $P_{m2}$. It can be seen that the slope $S_1$ for the two measured points a and b extends at a flatter angle than the comparison curve $P_v$ at the point of the associated mean concentration $P_{m1}$. This signifies that the decrease in concentration is too small, which leads to the conclusion that a malfunction is present. Therefore, the algorithm issues a warning. On the other hand, the slope $S_2$ for the two measured points c and d extends at a steeper angle than the slope of the comparison curve $P_v$ at the point of the associated mean concentration $P_{m2}$. Hence, the decrease in the concentration lies within the allowable limits so that no warning is issued, and the operation can be continued.

Although the invention has been described in terms of only one embodiment, anyone skilled in the art will perceive many varied alternatives, modifications, and variations in the light of the foregoing description, as well as the drawing, all of which fall under the present invention. In that way, the invention has been described above in terms of an application to a vehicle cab, however, it should be understood that the invention can be applied to other enclosed compartments. In place of the combined fresh air and recirculated air circuit described with only one blower, separate air circuits each with an associated blower could be provided.

Having described the preferred embodiment, it will become apparent that various modifications can be made without departing from the scope of the invention as defined in the accompanying claims.

What is claimed is:

1. In a combination of a closed compartment associated with an air circulation system including at least one blower associated with an air duct for effecting a flow of air between an inlet located exteriorly of said compartment and an outlet located interiorly of said compartment, with this flow passing through at least one air filter element, and at least one interior compartment sensor for detecting the degree of contamination of the air and being coupled to a control arrangement, the improvement comprising: said control arrangement including a memory; a performance map of the normal operation of the air circulation system being stored in said memory and containing information indicating a pre-determined decrease over time of the degree of contamination of the air by a known airborne contaminant; and said control arrangement including a comparing circuit for comparing the actual degree of contamination of said air over time with the values contained in said map, and for issuing a warning signal upon finding a deviation from said values contained in said map.

2. The combination, as defined in claim 1, wherein said at least one interior compartment sensor is one of a particle sensor or a particle counter.

3. The combination, as defined in claim 1, wherein said airborne contaminant is one of toxic particles and/or other particles that are harmful to health; and said interior compartment sensor being designed to respond to said airborne contaminant.

4. The combination, as defined in claim 1, wherein said interior compartment sensor is capable of detecting particles whose particle size amounts to a size down to the order of magnitude of 0.3 to 3 $\mu$m.

5. The combination, as defined in claim 1, wherein said at least one filter element is a fresh air filter element.

6. The combination, as defined in claim 1, wherein said at least one filter element contains an activated charcoal filter.

7. The combination, as defined in claim 1, wherein said blower is a variable speed blower capable of producing a higher pressure in said compartment than exists outside said compartment.

8. The combination, as defined in claim 7, and further including a pressure sensor located in said compartment and coupled to said control arrangement, sends a signal thereto representative of said sensed pressure; said control arrangement having stored in its memory a value representing a predetermined minimum pressure value which is compared with said sensed pressure; and said control arrangement being coupled to said blower and being operable when said sensed pressure is less than said minimum pressure for causing the speed of said blower to be increased.

9. The combination, as defined in claim 1, wherein said at least one filter element is provided with a coding element which permits an identification of said filter element and is coupled to said control arrangement; and said control arrangement including a coding recognition circuit for recognizing said at least one filter element; said control arrangement including a stored time value corresponding to the maximum amount of time said at least one filter element should be in use before being replaced; an operating time counter operable for summing the accumulated operating time of said at least one filter; and said control arrangement acting to compare the actual accumulated operating time of said at least one filter element with said stored time value and for sending out a warning signal in the event said accumulated operating time exceeds said stored time value.

\* \* \* \* \*